United States Patent
Nakagawa

(10) Patent No.: US 12,024,176 B2
(45) Date of Patent: Jul. 2, 2024

(54) VEHICLE TRAVELING CONTROL APPARATUS

(71) Applicant: SUBARU CORPORATION, Tokyo (JP)

(72) Inventor: Ryo Nakagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 257 days.

(21) Appl. No.: 17/692,552

(22) Filed: Mar. 11, 2022

(65) Prior Publication Data

US 2022/0315005 A1  Oct. 6, 2022

(30) Foreign Application Priority Data

Mar. 31, 2021 (JP) ................. 2021-060523

(51) Int. Cl.
*B60W 40/06* (2012.01)
*B60R 11/04* (2006.01)

(52) U.S. Cl.
CPC ............. *B60W 40/06* (2013.01); *B60R 11/04* (2013.01); *B60W 2420/403* (2013.01); *B60W 2552/20* (2020.02)

(58) Field of Classification Search
None
See application file for complete search history.

(56) References Cited

U.S. PATENT DOCUMENTS

| | | | | |
|---|---|---|---|---|
| 9,227,479 | B2* | 1/2016 | Clarke | B60W 30/18009 |
| 9,460,353 | B2* | 10/2016 | Rankin | G06V 20/58 |
| 9,884,555 | B2* | 2/2018 | Tran | B60K 35/00 |
| 9,898,005 | B2* | 2/2018 | Mei | B60W 30/08 |
| 2009/0187314 | A1* | 7/2009 | Kitamura | B60R 16/0231 |
| | | | | 701/45 |
| 2016/0196656 | A1* | 7/2016 | Cund | B60W 40/06 |
| | | | | 348/148 |
| 2016/0264142 | A1* | 9/2016 | Di Miro | B60W 30/18009 |

FOREIGN PATENT DOCUMENTS

JP  2018-203042 A  12/2018

* cited by examiner

*Primary Examiner* — Adam D Tissot
*Assistant Examiner* — Garrett F Evans
(74) *Attorney, Agent, or Firm* — TROUTMAN PEPPER HAMILTON SANDERS LLP

(57) ABSTRACT

A vehicle traveling control apparatus includes an imaging device, a sensor, an information storage, a traveling road detector, an imaging height detector, and a control unit. The traveling road detector detects that a vehicle is traveling on a road satisfying a condition. The imaging height detector detects a distance from a surface of the road to the imaging device position. The control unit includes a separation height estimator that estimates a height of a separation part, based on a result of the imaging height detector and the preset imaging device position, and a sensor height estimator that estimates a distance from an upper surface of the separation part to the sensor position, based on a result of the separation height estimator and the preset sensor position. The control unit stops detection by the sensor if a value estimated by the sensor height estimator becomes a threshold or less.

7 Claims, 3 Drawing Sheets

VEHICLE TRAVELING CONTROL APPARATUS

CROSS-REFERENCE TO RELATED APPLICATION

The present application claims priority from Japanese Patent Application No. 2021-060523 filed on Mar. 31, 2021, the entire contents of which are hereby incorporated by reference.

BACKGROUND

The technology relates to a vehicle traveling control apparatus that controls traveling of a vehicle.

For vehicles such as automobiles, an automatic driving control technique of causing a vehicle to travel automatically without requiring a driving operation of a driver who drives the vehicle has been recently developed. In addition, various vehicle traveling control apparatuses configured to assist the driver's driving operation have been proposed and put into practical use. The vehicle traveling control apparatus uses the automatic driving control technique to reduce the burden of the driver's driving operation, and to improve safety in causing the vehicle to travel.

For example, an existing vehicle traveling control apparatus includes a surrounding environment recognition device that uses various sensors (e.g., autonomous sensor devices), including an imaging device (e.g., a camera), a radar device, and a sonar device. The existing vehicle traveling control apparatus recognizes an obstacle present in regions (e.g., a front region and a rear region) in a traveling direction of a vehicle or side regions of the vehicle. Examples of the obstacle include another vehicle, a mobile body such as a pedestrian, a bicycle, or a two-wheeled vehicle, and a fixed object. On the basis of a result of the recognition, the existing vehicle traveling control apparatus performs a traveling control. Examples of the traveling control include an emergency braking control, e.g., an autonomous emergency braking (AEB) control, for avoidance of collision or contact with the obstacle, a steering control, and a rear and side alert assistance control during a lane change.

To enable these various traveling controls to be safely and reliably executed at all times, it is desired that the various sensors included in the traveling control apparatus operate with a predetermined detection accuracy at all times.

On the other hand, rivers overflowing, for example, due to heavy rain and typhoons caused by recent unusual weather can result in a situation in which a road on which a vehicle travels is flooded. In general, causing a vehicle to travel on a flooded road adversely affects the vehicle in some cases. It is thus desired to avoid causing a vehicle to travel on a flooded road to the extent possible. However, it may be necessary to cause a vehicle to travel even on a flooded road, depending on a situation in which the vehicle is placed.

Hence, various proposals have been made for a traveling control apparatus that performs a traveling control to cause a vehicle to safely enter a flooded road. For example, reference is made to Japanese Unexamined Patent Application Publication (JP-A) No. 2018-203042.

The traveling control apparatus disclosed in JP-A No. 2018-203042 estimates a water depth of a flooded part on the flooded road ahead of the vehicle, on the basis of three-dimensional image data acquired by an on-vehicle camera and surrounding environment information such as three-dimensional map data, and performs the traveling control based on an entrance speed corresponding to the estimated water depth. The traveling control apparatus thus enables the vehicle to safely enter and travel through the flooded part.

SUMMARY

An aspect of the technology provides a vehicle traveling control apparatus to be applied to a vehicle. The vehicle traveling control apparatus includes an imaging device, a sensor device, an information storage, a traveling road detecting unit, an imaging height detecting unit, and a control unit. The imaging device is configured to acquire a traveling environment ahead of the vehicle as image information. The sensor device is configured to acquire surrounding environment information including information on a side region of the vehicle. The information storage is configured to contain, in advance, height position information of the imaging device and height position information of the sensor device. The traveling road detecting unit is configured to detect whether the vehicle is traveling on a road satisfying a predetermined condition on the basis of the image information acquired by the imaging device. The imaging height detecting unit is configured to detect, in a case where the traveling road detecting unit detects that the vehicle is traveling on the road satisfying the predetermined condition, a distance in a height direction from a surface of the road satisfying the predetermined condition to an installation position of the imaging device. The control unit is configured to comprehensively control the whole vehicle traveling control apparatus. The control unit includes a separation height estimating unit and a sensor height estimating unit. The separation height estimating unit is configured to estimate, on the basis of a detection result obtained by the imaging height detecting unit and the preset height position information of the imaging device, a height of a separation part between a surface of a road with which a wheel of the vehicle is in contact and the surface of the road satisfying the predetermined condition. The sensor height estimating unit is configured to estimate, on the basis of an estimation result obtained by the separation height estimating unit and the preset height position information of the sensor device, a distance from an upper surface in a gravity direction of the separation part to an installation position of the sensor device. The control unit is configured to stop detection by the sensor device in a case where an estimated value obtained by the sensor height estimating unit becomes a predetermined threshold or less.

An aspect of the technology provides a vehicle traveling control apparatus to be applied to a vehicle. The vehicle traveling control apparatus includes an imaging device, a sensor device, an information storage, and circuitry. The imaging device is configured to acquire a traveling environment ahead of the vehicle as image information. The sensor device is configured to acquire surrounding environment information including information on a side region of the vehicle. The information storage is configured to contain, in advance, height position information of the imaging device and height position information of the sensor device. The circuitry is configured to perform a traveling road detection process of detecting whether the vehicle is traveling on a road satisfying a predetermined condition on the basis of the image information acquired by the imaging device. The circuitry is configured to perform an imaging height detection process of detecting, upon detecting that the vehicle is traveling on the road satisfying the predetermined condition, a distance in a height direction from a surface of the road satisfying the predetermined condition to an installation position of the imaging device. The circuitry is configured to comprehensively control the whole vehicle traveling control apparatus. The circuitry is configured to perform a separation height estimation process of estimating, on the basis of a detection result obtained by the imaging height detection process and the preset height position information of the imaging device, a height of a separation part between a surface of a road with which a wheel of the vehicle is in contact and the surface of the road satisfying the predetermined condition. The circuitry is configured to perform a sensor height estimation process of estimating, on the basis of an estimation result obtained by the separation height estimation process and the preset height position information of the sensor device, a distance from an upper surface in a gravity direction of the separation part to an installation position of the sensor device. The circuitry is configured to stop detection by the sensor device in a case where an estimated value obtained by the sensor height estimation process becomes a predetermined threshold or less.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
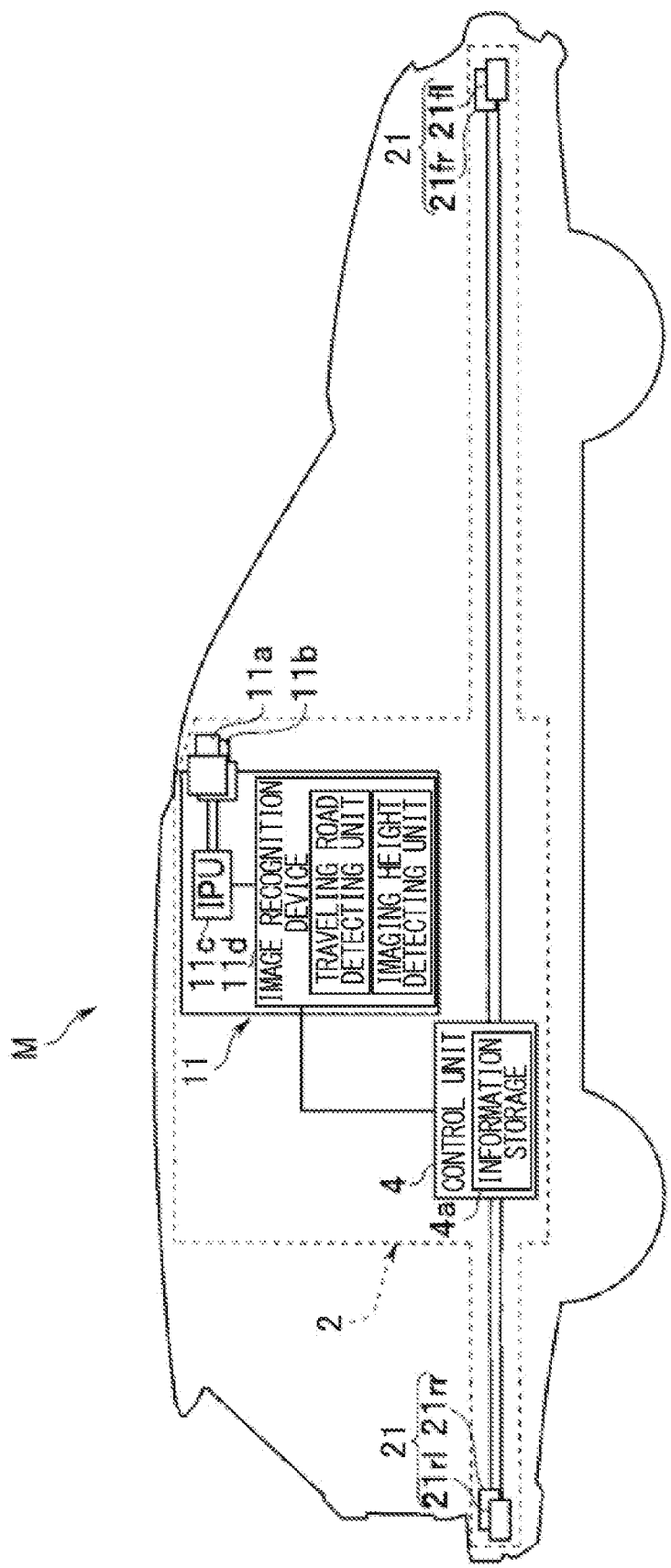
FIG. 1 is a block diagram illustrating an outline configuration of a vehicle mounted with a traveling control apparatus according to one example embodiment of the technology.

Various sensors included in a traveling control apparatus include a sensor that is installed on an outer surface of a vehicle, for example, at a position whose height from a road surface is relatively low (e.g., a position whose height from the road surface is around 500 mm). For example, a sensor may be installed on a surface of a front or rear bumper or a side surface of the vehicle.

In a case where a vehicle including various sensors installed at such positions travels on a flooded road, the various sensors installed at the low positions (e.g., the surface of the front or rear bumper) on the outer surface of the vehicle can be unable to ensure a normal predetermined detection accuracy, and can erroneously detect a surrounding obstacle, for example. This raises a concern that a malfunction can occur in a traveling control for a driving assistance control executed on the basis of a detection result of these various sensors.

Such a concern has not been taken into consideration in the existing traveling control apparatus disclosed in JP-A No. 2018-203042.

In addition, if a situation arises in which a vehicle mounted with an existing traveling control apparatus has to travel on a flooded part of a flooded road, a driver who drives the vehicle may have to judge a surrounding situation, and perform, depending on the situation, a manual operation to stop a predetermined function based on various traveling controls that are performed on the basis of a detection result of various sensors.

Under such a situation, however, the driver can be unable to make a normal cool judgment, or the driver can forget a predetermined manual operation.

It is desirable to provide a vehicle traveling control apparatus that makes it possible to suppress a malfunction of a traveling control for a driving assistance control.

In the following, some example embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the technology unless otherwise stated. Further, elements in the following example embodiments which are not recited in a most-generic independent claim of the disclosure are optional and may be provided on an as-needed basis. Throughout the specification and the drawings, elements having substantially the same function and configuration are denoted with the same reference numerals to avoid redundant description.

A traveling control apparatus according to an example embodiment of the technology may be mounted on a vehicle such as an automobile, and may execute a traveling control for assistance with a driving operation performed by a driver who drives the vehicle. The traveling control apparatus according to the example embodiment may use various sensors including a camera unit (i.e., an imaging device) and a radar device, for example, to acquire information regarding a surrounding environment of the vehicle. Autonomous sensor devices that each operate autonomously may be used as these various sensors.

The information regarding the surrounding environment of the vehicle may refer to information on various objects, for example, present around the vehicle. Examples of such various objects may include: another vehicle, such as a preceding vehicle, a subsequent vehicle, an oncoming vehicle, or a side-by-side vehicle, traveling around the vehicle; a mobile body, such as a pedestrian or a bicycle; and a fixed object, such as a building or various constructions. Hereinafter, the information regarding the surrounding environment of the vehicle may be referred to as surrounding environment information, for example.

The traveling control apparatus according to the example embodiment may appropriately use the surrounding environment information acquired by using the various sensors, including the camera unit and the radar device, to perform a traveling control that assists the driving operation of the driver of the vehicle.

A description is given of an outline configuration of a traveling control apparatus according to an example embodiment of the technology, with reference to FIG. 1. FIG. 1 is a block diagram illustrating an outline configuration of a vehicle mounted with the traveling control apparatus according to the example embodiment of the technology.

A traveling control apparatus 2 according to the example embodiment may be mounted on a vehicle M (hereinafter, also referred to as an own vehicle), such as an automobile, as described above. The traveling control apparatus 2 may have, for example, a configuration substantially similar to that of an existing same type of traveling control apparatus. Accordingly, FIG. 1 illustrates only elements directly related to any embodiment of the technology, out of elements of the traveling control apparatus 2 according to the example embodiment, and omits elements not directly related to any embodiment of the technology. In the following description, assuming that elements other than the elements directly related to any embodiment of the technology are substantially similar to those of the existing traveling control apparatus, detailed description thereof is omitted, and only the elements directly related to any embodiment of the technology are described in detail.

As illustrated in FIG. 1, the traveling control apparatus 2 according to the example embodiment may include various sensors (e.g., a camera unit 11 and a radar device 21) and a control unit 4, for example. The various sensors may be provided to recognize the surrounding environment of the vehicle M. The control unit 4 comprehensively controls the whole of the traveling control apparatus 2.

The various sensors (e.g., autonomous sensor devices) to be used to recognize the surrounding environment of the vehicle M may include the camera unit 11 and the radar device 21, for example, and unillustrated sensors. In one embodiment, the camera unit 11 may serve as an "imaging device". In one embodiment, the radar device 21 may serve as a "sensor device". Examples of the unillustrated sensors may include: a longitudinal acceleration sensor that detects a longitudinal acceleration of the own vehicle; a wheel speed sensor that detects a speed of rotation of each of a front-right wheel, a front-left wheel, a rear-right wheel, and a rear-left wheel; a gyro sensor that detects an angular velocity or angular acceleration of the own vehicle; and a global navigation satellite system (GNSS) receiver that receives positioning signals from a plurality of positioning satellites. These various sensors may be coupled to the control unit 4, for example. The control unit 4 may receive outputs from these various sensors, and execute a predetermined traveling control via an unillustrated predetermined unit as appropriate.

The camera unit 11 serving as the imaging device may include a stereo camera, an image processing unit (IPU) 11c, and an image recognition device 11d, for example. The stereo camera may include, for example, a main camera 11a and a sub-camera 11b fixed to the upper middle of a front part in a vehicle compartment of the vehicle M. The IPU hic may be coupled to the stereo camera, or the two cameras, i.e., the main camera 11a and the sub-camera 11b. The IPU hic may also be coupled to the image recognition device 11d.

The main camera 11a and the sub-camera 11b included in the stereo camera may be, for example, autonomous sensor devices that sense a real space ahead of the vehicle M, and acquire image information mainly on a surrounding traveling environment ahead of the vehicle. The main camera 11a and the sub-camera 11b of the stereo camera may be disposed, for example, at symmetrical positions with respect to a midpoint in a vehicle-width direction. The stereo camera may thus acquire two pieces of image data obtained by imaging, from different viewpoints, a predetermined region ahead of the vehicle M (see a reference numeral V in FIG. 2) by the two cameras (i.e., the main camera 11a and the sub-camera 11b).

The IPU 11c may be a circuit unit that performs predetermined image processing on the basis of the two pieces of image data acquired by the two cameras (i.e., the main camera 11a and the sub-camera 11b). For example, the IPU 11c may generate stereo image information, or three-dimensional image information, on the basis of the two pieces of image data acquired by the two cameras (i.e., the main camera 11a and the sub-camera 11b). The IPU 11c may also generate, for example, image information (hereinafter, referred to as distance image information) including distance information determined on the basis of an amount of shift in position, on the two images, of the same target imaged in each of the two pieces of image data. The distance image information thus generated may be transmitted to the image recognition device 11d.

The image recognition device 11d may receive the distance image information, for example, transmitted from the IPU 11c, and recognize a situation of a surface of a road on which the vehicle M travels (hereinafter, referred to as a road surface situation), on the basis of the distance image information. For example, the image recognition device 11d may recognize lane lines that define left and right of a traveling lane of the road on which the vehicle M travels, and determine various pieces of information, including a road curvature [1/m] of each of the left and right lane lines and a width (i.e., a lane width) between the left and right lane lines.

The road curvature and the lane width may be determined by any of various known methods. For example, on the basis of the image information, the left and right lane lines may be recognized by performing a binarization process that utilizes a difference in luminance. The curvature of each of the left and right lane lines may be determined for each predetermined section through, for example, a curve-approximating expression that is based on a least-square method.

The image recognition device 11d may also perform predetermined pattern matching, for example, on the basis of the distance image information, to recognize a three-dimensional object. Examples of the three-dimensional object may include a guard rail and a curbstone that extend along the road, and a pedestrian, a two-wheeled vehicle, and another vehicle other than a two-wheeled vehicle that are present on the road on which the vehicle M travels. As the recognition of the three-dimensional object, the image recognition device 11d may recognize, for example, various pieces of information, including a type of the three-dimensional object, a distance to the three-dimensional object, a movement speed of the three-dimensional object, and a relative speed between the three-dimensional object and the vehicle M.

Furthermore, in recognizing the road surface situation on the basis of the distance image information, the image recognition device 11d may also perform the following recognition. For example, in a case where the vehicle M is traveling on a flooded road, the image recognition device 11d may recognize a situation of a surface of a flooded part (hereinafter, referred to as a water surface situation) on the basis of the distance image information. Note that the flooded part may refer to a separation part between a surface of a road with which a wheel of the vehicle is in contact, and a surface of a road satisfying a predetermined condition (the flooded road in the example embodiment).

In general, a water surface situation on a flooded road is often wavy. Therefore, the image recognition device 11d may estimate that the vehicle is traveling on a flooded road, in a case where a predetermined state different from a typical road surface is recognized as a recognition result of the road surface situation based on the distance image information.

In one example, the predetermined state may be a state matching, for example, a characteristic water surface situation representing a state in which the water surface is wavy. In addition, in a state in which the water surface has no wave, for example, the water surface is in a completely flat state, in which case the water surface seems to be in a state close to a so-called mirror surface. In this case, the water surface reflects surrounding scenery, for example, and accordingly it is possible to estimate that the surface is a water surface different from the typical road surface. Thus, it is possible to estimate that the vehicle is traveling on a flooded road also in this case.

In this case, the image recognition device 11$d$ of the camera unit 11 (i.e., the imaging device) detects that the vehicle M is traveling on the road satisfying the predetermined condition (the flooded road in the example embodiment), on the basis of the image information acquired by the two cameras (i.e., the main camera 11$a$ and the sub-camera 11$b$), or the imaging device. In one embodiment, the image recognition device 11$d$ may serve as a "traveling road detecting unit" or a "flooding detecting unit".

Note that, as described above, the predetermined condition may refer to a condition under which the recognition result of the road surface situation obtained by the image recognition device 11$d$ indicates a predetermined state different from the typical road surface, for example, a condition under which the surface is estimated to be a water surface or a snow surface. The water surface or the snow surface, for example, may be recognized under a condition based on a known image recognition technique.

The image recognition device 11$d$ may also detect a distance (see a reference numeral h3 in FIG. 2) between the recognized water surface (see a reference numeral 110$a$ in FIG. 2) and a camera position. In this case, if the image recognition device 11$d$ serving as the traveling road detecting unit or the flooding detecting unit detects that the vehicle M is traveling on the road satisfying the predetermined condition (the flooded road in the example embodiment), the image recognition device 11$d$ detects a distance in a height direction from the surface of the road satisfying the predetermined condition (the flooded road in the example embodiment), i.e., the water surface of the flooded part, to an installation position of the two cameras (i.e., the main camera 11$a$ and the sub-camera 11$b$), or the imaging device. In one embodiment, the image recognition device 11$d$ may serve as an "imaging height detecting unit" or a "water surface height detecting unit".

Note that the control unit 4 may include: a known microcomputer including, without limitation, a central processing unit (CPU), a random-access memory (RAM), a read-only memory (ROM), and a non-volatile storage; and a peripheral device thereof. The ROM may contain, for example, a program to be executed by the CPU and fixed data, such as a data table, stored in advance. For example, the ROM is assumed to contain installation position information of the radar device 21 and installation position information of the camera unit 11, in the vehicle M, stored in advance. The ROM may thus serve as an information storage 4$a$ that contains, in advance, height position information of the camera unit 11 (i.e., the imaging device) and height position information of the radar device 21 (i.e., the sensor device).

The installation position information of the camera unit 11 may be, in one example, distance information in the height direction (see a reference numeral h2 in FIG. 2) from the contact surface with the wheel of the vehicle M (i.e., a road surface; see a reference numeral 100$a$ in FIG. 2) to the installation position of the two cameras, or the main camera 11$a$ and the sub-camera 11$b$. Similarly, the installation position information of the radar device 21 may be, in one example, distance information in the height direction (see a reference numeral h1 in FIG. 2) from the contact surface with the wheel of the vehicle M (i.e., the road surface; see the reference numeral 100$a$ in FIG. 2) to the installation position of the radar device 21. Accordingly, the installation position information of the radar device 21 and the installation position information of the camera unit 11 denoted by the reference numerals h1 and h2 in FIG. 2 may be information treated as fixed values, or preset values, preset in the specific vehicle M.

The radar device 21 may include a plurality of radar devices. The example embodiment describes an example in which the vehicle M includes four radar devices. The plurality of (e.g., four) radar devices may be a front-left side radar device 21$fl$, a front-right side radar device 21$fr$, a rear-left side radar device 21$rl$, and a rear-right side radar device 21$rr$, for example. These plurality of radar devices (21$fl$, 21$fr$, 21$rl$, and 21$rr$) may each be coupled to the control unit 4.

Of the plurality of radar devices (e.g., the front-left side radar device 21$fl$, the front-right side radar device 21$fr$, the rear-left side radar device 21$rl$, and the rear-right side radar device 21$rr$) included in the radar device 21, the front-left side radar device 21$fl$ and the front-right side radar device 21$fr$ may be, for example, respectively provided on left and right side parts of a front bumper of the vehicle M. The front-left side radar device 21$fl$ and the front-right side radar device 21$fr$ may recognize an object present in left-front, right-front, and side regions of the vehicle M, which is difficult to recognize on the basis of the image data acquired by the stereo camera, or the two cameras, i.e., the main camera 11$a$ and the sub-camera 11$b$. Note that the region recognized by the front-left side radar device 21$fl$ and the region recognized by the front-right side radar device 21$fr$ may each be set to partly overlap with a portion of the region recognized by the stereo camera, or the two cameras, i.e., the main camera 11$a$ and the sub-camera 11$b$. Thus, the stereo camera, or the two cameras, i.e., the main camera 11$a$ and the sub-camera 11$b$, and the front-left side radar device 21$fl$ and the front-right side radar device 21$fr$ may be configured to be able to recognize substantially the entire region from the front left and right sides to the front of the vehicle M.

Of the plurality of radar devices (e.g., the front-left side radar device 21$fl$, the front-right side radar device 21$fr$, the rear-left side radar device 21$rl$, and the rear-right side radar device 21$rr$) included in the radar device 21, the rear-left side radar device 21$rl$ and the rear-right side radar device 21$rr$ may be, for example, respectively provided on left and right side parts of a rear bumper of the vehicle M. The rear-left side radar device 21$rl$ and the rear-right side radar device 21$rr$ may recognize an object present in a region from the rear left and right sides to the rear of the vehicle M, which is difficult to recognize by the front-left side radar device 21$fl$ and the front-right side radar device 21$fr$ described above. Note that the region recognized by the rear-left side radar device 21$rl$ and the region recognized by the rear-right side radar device 21$rr$ may be set to partly overlap with each other. Thus, the rear-left side radar device 21$rl$ and the rear-right side radar device 21$rr$ may be configured to be able to recognize substantially the entire region from the rear left and right sides to the rear of the vehicle M.

The radar device 21 may thus be a sensor device that acquires surrounding environment information on the front and rear regions and the left and right side regions of the vehicle M. A millimeter-wave radar device, a laser radar device, or a light detection and ranging (LiDAR) device may be used, for example, as the radar device 21.

The radar device 21 may, every preset frame period, emit a radar wave in a horizontal direction and receive a reflected wave of the emitted radar wave. Examples of the radar wave may include a radio wave and a laser beam. The radar device 21 may thus detect a plurality of reflection points on a three-dimensional object present around the vehicle M. The radar device 21 may analyze positions and movement speeds, for example, of the detected reflection points and perform grouping to thereby recognize the three-dimensional object. The positions to be analyzed may be relative positions with respect to the own vehicle.

The radar device 21 may set the reflection point closest to the vehicle M in direct distance, out of the reflection points on the recognized three-dimensional object, as a representative point of the three-dimensional object. The radar device 21 may recognize, as information regarding the representative point, a position and a relative speed of the reflection point corresponding to the representative point, for example. The radar device 21 may also recognize the size of the three-dimensional object calculated on the basis of distribution of the reflection points.

The information regarding the object thus recognized by the radar device 21 may be supplied to the control unit 4. Receiving the information, the control unit 4 may recognize, as the three-dimensional object, a preceding other vehicle present ahead of the vehicle M, a side-by-side other vehicle present on the left and right sides of the vehicle M, a crossing other vehicle approaching the vehicle M from a direction crossing a traveling course of the vehicle M at an intersection, for example, and a subsequent other vehicle present behind the vehicle M. The control unit 4 may also recognize, as the three-dimensional object, various mobile bodies, including a pedestrian and a bicycle, present around the vehicle M.

The control unit 4 may control operation situations of the camera unit 11 and the radar device 21, for example. The control unit 4 may also receive a detection result (i.e., the surrounding environment information) from each sensor, and supply the detection result to the unillustrated predetermined unit to use the detection result for a predetermined traveling control as appropriate. The traveling control apparatus 2 according to the example embodiment may have the outline configuration described above.

Figure 2:
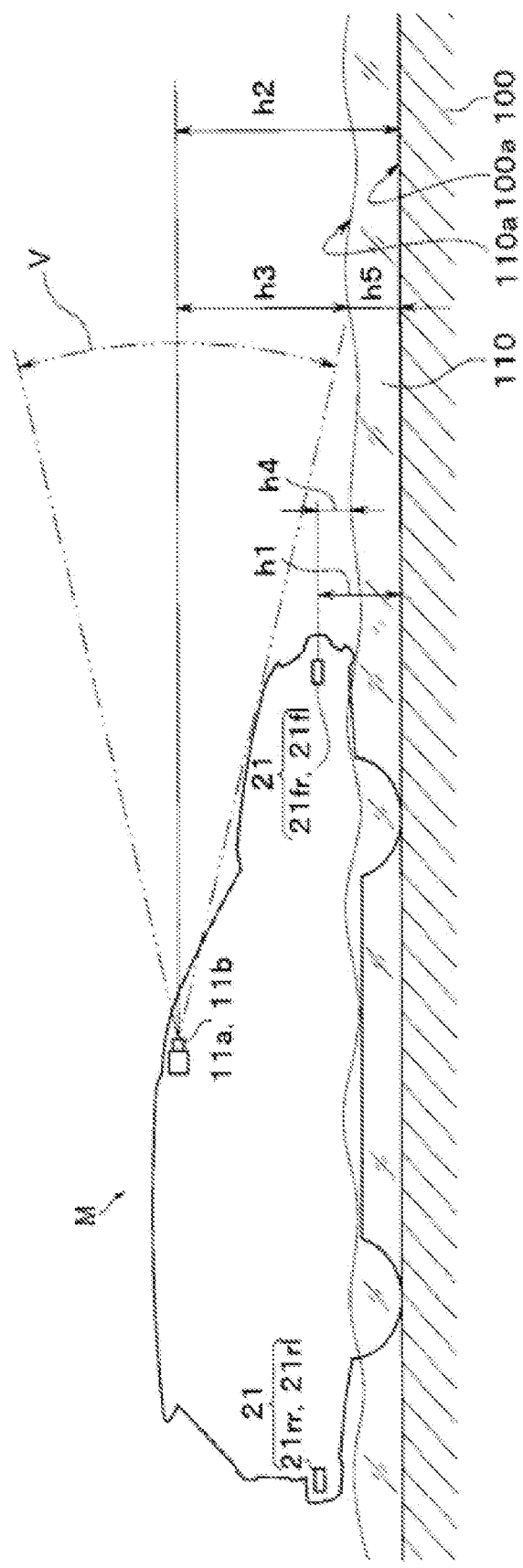
FIG. 2 is a conceptual diagram illustrating, as an example, a specific situation in a case where the vehicle mounted with the traveling control apparatus according to one example embodiment of the technology travels on a flooded road.
Figure 3:
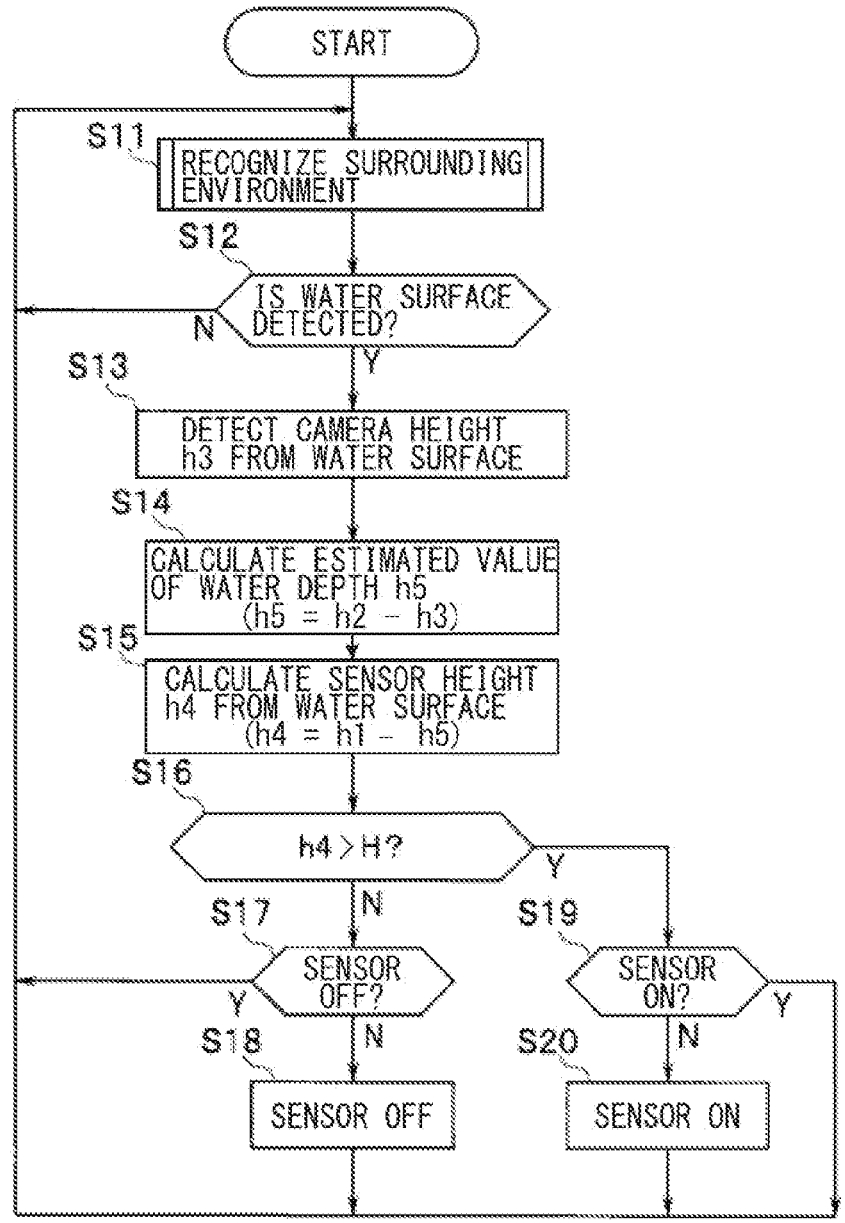
FIG. 3 is a flowchart illustrating extracted workings related to the technology, out of workings of the traveling control apparatus according to one example embodiment of the technology.

Workings of the traveling control apparatus 2 according to the example embodiment having such a configuration are described below with reference to FIG. 2 and FIG. 3. FIG. 2 is a conceptual diagram illustrating, as an example, a specific situation in a case where the vehicle mounted with the traveling control apparatus according to the example embodiment of the technology travels on a flooded road. FIG. 3 is a flowchart illustrating extracted workings related to the technology, out of workings of the traveling control apparatus according to the example embodiment of the technology.

A process sequence illustrated in FIG. 3 may be processes continuously executed at all times concurrently with various controls of the traveling control apparatus 2 according to the example embodiment. In other words, the process sequence in FIG. 3 may start to be executed at the same time as the traveling control apparatus 2 is brought into operation, and may be continuously executed while the traveling control apparatus 2 is in operation. The process sequence may also stop at the same time as the operation of the traveling control apparatus 2 is stopped.

The vehicle M mounted with the traveling control apparatus 2 according to the example embodiment is assumed to be traveling on a flooded road, as illustrated in FIG. 2. In FIG. 2, a reference numeral 100 conceptually denotes a cross-section of a road (hereinafter, referred to as the road 100), and the reference numeral 100a denotes the surface of the road 100 (hereinafter, referred to as the road surface 100a).

The situation illustrated as an example in FIG. 2 indicates a situation in which the road 100 is flooded. A reference numeral 110 in FIG. 2 conceptually denotes a cross-section of the flooded part (hereinafter, referred to as the flooded part 110), and the reference numeral 110a denotes the surface of the flooded part 110 (hereinafter, referred to as the water surface 110a).

In FIG. 2, the reference numeral V conceptually denotes a field of view range of the two cameras, or the main camera 11a and the sub-camera 11b, included in the camera unit 11 (hereinafter, referred to as the field of view range V). The reference numeral V denotes, for example, an angle of view in a vertical direction of the field of view range.

The reference numeral h1 in FIG. 2 denotes the distance in the height direction (hereinafter, referred to as the sensor height h1) from the road surface 100a to the installation position of the radar device 21, which is one of the various sensors included in the traveling control apparatus 2. The sensor height h1 may be a preset value unique to the vehicle M mounted with the traveling control apparatus 2.

A passenger car may be assumed as the vehicle M mounted with the traveling control apparatus 2 according to the example embodiment, as illustrated in FIG. 2. Accordingly, the sensor height h1 in the vehicle M may be assumed to be about 500 mm, for example, in consideration of positions of the front and rear bumpers of the vehicle M. Note that, as the preset value of the sensor height h1, different values may be used as appropriate depending on a type of the vehicle M.

The reference numeral h2 in FIG. 2 denotes the distance in the height direction (hereinafter, referred to as the camera height h2) from the road surface 100a to the installation position of the two cameras (i.e., the main camera 11a and the sub-camera 11b) of the camera unit 11 included in the traveling control apparatus 2. The camera height h2 may be a preset value unique to the vehicle M mounted with the traveling control apparatus 2, as with the sensor height h1. Also as the preset value of the camera height h2, different values may be used as appropriate depending on the type of the vehicle M.

The reference numeral h3 in FIG. 2 denotes the distance in the height direction (hereinafter, referred to as the camera height h3 from the water surface) from the water surface 110a to the installation position of the two cameras (i.e., the main camera 11a and the sub-camera 11b). The camera height h3 from the water surface may be an estimated value detected at the same time when the water surface situation is recognized by the image recognition device 11d of the camera unit 11.

A reference numeral h4 in FIG. 2 denotes a distance in the height direction (hereinafter, referred to as the sensor height h4 from the water surface) from the water surface 110a to the installation position of the radar device 21. The sensor height h4 from the water surface may be an estimated value calculated by the control unit 4.

A reference numeral h5 in FIG. 2 denotes a distance in the height direction from the road surface 100a to the water surface 110a, i.e., a water depth (hereinafter, referred to as the water depth h5) of the flooded part 110. The water depth h5 may be an estimated value calculated by the control unit 4.

Under such a situation, the traveling control apparatus 2 may control traveling of the vehicle M while recognizing the surrounding environment of the vehicle M by using the various sensors, including the camera unit 11 and the radar device 21 (step S11 in FIG. 3).

In one example, in the camera unit 11, the two cameras (i.e., the main camera 11a and the sub-camera 11b) may acquire the real space of the field of view range V that is the predetermined region ahead of the vehicle M, as two pieces of image data. The acquired two pieces of image data may be supplied to the IPU 11c. Receiving the two pieces of image data, the IPU 11c may perform the predetermined image processing to generate the stereo image information, or the three-dimensional image information, and may generate the distance image information, for example. The distance image information thus generated may be supplied to the image recognition device 11d. Receiving the distance image information, the image recognition device 11d may recognize the road surface situation or the water surface situation. A result of the recognition may be transmitted from the image recognition device 11d to the control unit 4. In this case, if the recognition result indicates a water surface situation, the image recognition device 11d may further detect the camera height h3 from the water surface on the basis of the recognition result of the recognized water surface situation. This information on the camera height h3 from the water surface may also be transmitted from the image recognition device 11d to the control unit 4.

In step S12 of FIG. 3, the control unit 4 may receive the recognition result of the road surface situation or the water surface situation obtained by the image recognition device 11d, and confirm whether the vehicle M is currently in a situation of traveling on a flooded road. In this case, if it is confirmed that the vehicle M is traveling on a flooded road, the flow may proceed to the process of step S13. If it is confirmed that the vehicle M is in a situation of not traveling on a flooded road but traveling on a normal road, the flow may return to the process of step S11.

As described above, in a case where the recognition result obtained by the image recognition device 11d indicates a water surface situation, the image recognition device 11d may detect the camera height h3 from the water surface on the basis of the recognition result of the recognized water surface situation (step S13 in FIG. 3). This information may be transmitted from the image recognition device 11d to the control unit 4.

Subsequently, in step S14, the control unit 4 may calculate the estimated value of the water depth h5. The water depth h5 may be calculated on the basis of the camera height h2 (preset value) and the camera height h3 from the water surface detected in the above process of step S13, by the following expression (1):

$$h5=h2-h3 \quad (1).$$

In this case, the control unit 4 estimates the water depth h5 of the flooded part 110 (the height of the separation part), on the basis of the detection result obtained by the image recognition device 11d serving as the imaging height detecting unit or the water surface height detecting unit, and the preset height position information of the camera unit 11 (preset value). In one embodiment, the control unit 4 may serve as a "separation height estimating unit" or a "water depth estimating unit".

Next, in step S15, the control unit 4 may calculate the estimated value of the sensor height h4 from the water surface. The sensor height h4 from the water surface may be calculated on the basis of the sensor height h1 (preset value) and the water depth h5 calculated in the above process of step S14, by the following expression (2):

$$h4=h1-h5 \quad (2).$$

In this case, the control unit 4 estimates the distance h4 from the water surface 110a of the flooded part 110, i.e., the separation part, to the installation position of the radar device 21, on the basis of an estimation result of the water depth h5 obtained by the control unit 4 serving as the separation height estimating unit or the water depth estimating unit, and the preset height position information of the radar device 21, i.e., the sensor device (preset value). In one embodiment, the water surface 110a may serve as an "upper surface in a gravity direction". In one embodiment, the control unit 4 may serve as a "sensor height estimating unit".

Subsequently, in step S16, the control unit 4 may confirm whether the sensor height h4 from the water surface calculated in the above process of step S15 is larger than a predetermined threshold H.

In general, the distance between the water surface 110a and the installation position of the radar device 21 becomes closer as the water depth h5 of the flooded part 110 becomes deeper. In this case, if the distance from the water surface 110a to the installation position of the radar device 21 falls below a predetermined distance, it can become difficult for the radar device 21 to operate with a normal detection accuracy.

Hence, in the traveling control apparatus 2 according to the example embodiment, the predetermined distance between the water surface 110a and the installation position of the radar device 21 in a case where the radar device 21 is able to ensure operation with the normal predetermined detection accuracy may be preset as the predetermined threshold H. In one example, the predetermined threshold H may be set to about 200 mm to about 300 mm in a case where the sensor height h1 (preset value) is set to about 500 mm, for example.

In the process of step S16 in FIG. 3, if it is confirmed that h4>H is not satisfied ("N" in step S16), the flow may proceed to the process of step S17. If it is confirmed that h4>H is satisfied ("Y" in step S16), the flow may proceed to the process of step S19.

In step S17, the control unit 4 may confirm whether the radar device 21 is in an off state, i.e., a detection stopped state. If it is confirmed that the radar device 21 is in the off state ("Y" in step S17), the flow may return to the process of step S11. If it is confirmed that the radar device 21 is not in the off state but is in an on state ("N" in step S17), the flow may proceed to the process of step S18.

In step S18, the control unit 4 may execute a sensor-off process for stopping of the detection by the radar device 21. Thereafter, the flow may return to the process of step S11.

In step S19, the control unit 4 may confirm whether the radar device 21 is in the on state, i.e., a detection operating state. If it is confirmed that the radar device 21 is in the on state ("Y" in step S19), the flow may return to the process of step S11. If it is confirmed that the radar device 21 is not in the on state but is in the off state ("N" in step S19), the flow may proceed to the process of step S20.

In step S20, the control unit 4 may execute a sensor-on process for starting of operation of the detection by the radar device 21. Thereafter, the flow may return to the process of step S11.

According to one example embodiment described above, even in a case of traveling on a flooded road, if a situation arises in which erroneous detection by the various sensors included in the traveling control apparatus 2 is likely to occur, the operation of the corresponding sensor device (e.g., the radar device 21 in the example embodiment) is automatically switched to the off state as described above. This suppresses occurrence of the erroneous detection by the sensor device. This makes it possible to reliably suppress a malfunction of a traveling control for a driving assistance control performed on the basis of the detection result of the sensor device. This helps to perform a more safe and reliable traveling control of the vehicle.

Note that, although the example embodiment describes the radar device 21 as an example of the sensor device whose detection operation is to be stopped while the vehicle is traveling on a flooded road, the technology is not limited thereto. The technology is easily applicable also in a case where the detection operation of another sensor device is to be stopped.

In addition, although the example embodiment describes, as an example, the situation when the vehicle mounted with the traveling control apparatus 2 travels on a flooded road, the situation addressed by the traveling control apparatus 2 according to any embodiment of the technology is not limited to only when the vehicle travels on a flooded road. The traveling control apparatus 2 according to any embodiment of the technology is able to similarly address a snowy road traveling situation, for example, in addition to a flooded road traveling situation.

In this case, the flooding detecting unit serving as the traveling road detecting unit (e.g., the image recognition device 11d) according to one example embodiment described above may detect that the vehicle is traveling on the road satisfying the predetermined condition (here, a snowy road), on the basis of the image information acquired by the imaging device (e.g., the camera unit 11). In one embodiment, the image recognition device 11d may serve as a "snow coverage detecting unit" serving as the traveling road detecting unit.

In addition, the water surface height detecting unit serving as the imaging height detecting unit (e.g., the image recognition device 11d) according to one example embodiment described above may detect a distance in the height direction from a surface of a snow-covered part to the installation position of the imaging device (e.g., the camera unit 11), in a case where the snow coverage detecting unit detects that the vehicle is traveling on the snowy road. In one embodiment, the image recognition device 11d may serve as a "snow surface height detecting unit" serving as the imaging height detecting unit.

The water depth estimating unit serving as the separation height estimating unit (e.g., the control unit 4) according to one example embodiment described above may estimate a depth of the snow-covered part on the basis of a detection result obtained by the snow surface height detecting unit serving as the separation height estimating unit and the preset height position information of the imaging device (e.g., the camera unit 11). In one embodiment, the control unit 4 may serve as a "snow depth estimating unit" serving as the separation height estimating unit.

The sensor height estimating unit (e.g., the control unit 4) according to one example embodiment described above may serve as a unit that estimates a distance from the surface of the snow-covered part to the installation position of the sensor device (e.g., the radar device 21), on the basis of an estimation result obtained by the snow depth estimating unit and the preset height position information of the sensor device (e.g., the radar device 21).

Such a configuration enables the traveling control apparatus 2 according to one example embodiment described above to operate similarly also when the vehicle travels on a snowy road, making it possible to achieve similar example effects.

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein. For example, in a case where the above-described concerns may be addressed and the above-described effects may be obtained even if some features are deleted from all the features disclosed herein, the remaining features may be extracted as a technology. Elements in different example embodiments may be combined as appropriate. The technology is limited only by the appended claims or the equivalents thereof, and is not limited by specific example embodiments thereof.

Each of the control unit 4 and the image recognition device 11d illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the control unit 4 and the image recognition device 11d. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the control unit 4 and the image recognition device 11d illustrated in FIG. 1.

The invention claimed is:

1. A vehicle traveling control apparatus to be applied to a vehicle, the vehicle traveling control apparatus comprising:
   an imaging device configured to acquire a traveling environment ahead of the vehicle as image information;
   a sensor device configured to acquire surrounding environment information including information on a side region of the vehicle;
   an information storage configured to contain, in advance, preset height position information of the imaging device and preset height position information of the sensor device;
   a traveling road detecting unit configured to detect whether the vehicle is traveling on a road satisfying a predetermined condition on a basis of the image information acquired by the imaging device;
   an imaging height detecting unit configured to detect, in a case where the traveling road detecting unit detects that the vehicle is traveling on the road satisfying the predetermined condition, a distance in a height direction from a surface of the road satisfying the predetermined condition to an installation position of the imaging device; and a control unit configured to comprehensively control the whole vehicle traveling control apparatus, wherein the control unit includes a separation height estimating unit configured to estimate, on a basis of a detection result obtained by the imaging height detecting unit and the preset height position information of the imaging device, a height of a separation part between a surface of a road with which a wheel of the vehicle is in contact and the surface of the road satisfying the predetermined condition, and a sensor height estimating unit configured to estimate, on a basis of an estimation result obtained by the separation height estimating unit and the preset height position information of the sensor device, a distance from an upper surface in a gravity direction of the separation part to an installation position of the sensor device, and the control unit is configured to stop detection by the sensor device in a case where an estimated value obtained by the sensor height estimating unit becomes a predetermined threshold or less.

2. The vehicle traveling control apparatus according to claim 1, wherein the road satisfying the predetermined condition comprises a flooded road, the traveling road detecting unit comprises a flooding detecting unit configured to detect whether the vehicle is traveling on the flooded road on the basis of the image information acquired by the imaging device, the imaging height detecting unit comprises a water surface height detecting unit configured to detect, in a case where the flooding detecting unit detects that the vehicle is traveling on the flooded road, a distance in the height direction from a water surface of a flooded part serving as the separation part to the installation position of the imaging device, the separation height estimating unit comprises a water depth estimating unit configured to estimate a water depth of the flooded part on a basis of a detection result obtained by the water surface height detecting unit and the preset height position information of the imaging device, and the sensor height estimating unit is configured to estimate a distance from the water surface of the flooded part to the installation position of the sensor device on a basis of an estimation result obtained by the water depth estimating unit and the preset height position information of the sensor device.

3. The vehicle traveling control apparatus according to claim 1, wherein the road satisfying the predetermined condition comprises a snowy road, the traveling road detecting unit comprises a snow coverage detecting unit configured to detect whether the vehicle is traveling on the snowy road on the basis of the image information acquired by the imaging device, the imaging height detecting unit comprises a snow surface height detecting unit configured to detect, in a case where the snow coverage detecting unit detects that the vehicle is traveling on the snowy road, a distance in the height direction from a surface of a snow-covered part serving as the separation part to the installation position of the imaging device, the separation height estimating unit comprises a snow depth estimating unit configured to estimate a depth of the snow-covered part on a basis of a detection result obtained by the snow surface height detecting unit and the preset height position information of the imaging device, and the sensor height estimating unit is configured to estimate a distance from the surface of the snow-covered part to the installation position of the sensor device on a basis of an estimation result obtained by the snow depth estimating unit and the preset height position information of the sensor device.

4. The vehicle traveling control apparatus according to claim 2, wherein the predetermined threshold is set to a value corresponding to a minimum distance between the sensor device and the water surface of the flooded part in a case where the sensor device is able to ensure operation with a predetermined detection accuracy.

5. The vehicle traveling control apparatus according to claim 2, wherein the imaging device comprises a camera unit that includes a stereo camera including two cameras, the sensor device comprises a millimeter-wave radar device, and the millimeter-wave radar device is installed at a position closer to a road surface than the camera unit is.

6. The vehicle traveling control apparatus according to claim 3, wherein the imaging device comprises a camera unit that includes a stereo camera including two cameras, the sensor device comprises a millimeter-wave radar device, and the millimeter-wave radar device is installed at a position closer to a road surface than the camera unit is.

7. A vehicle traveling control apparatus to be applied to a vehicle, the vehicle traveling control apparatus comprising:

an imaging device configured to acquire a traveling environment ahead of the vehicle as image information;

a sensor device configured to acquire surrounding environment information including information on a side region of the vehicle;

an information storage configured to contain, in advance, preset height position information of the imaging device and preset height position information of the sensor device; and circuitry configured to perform a traveling road detection process of detecting whether the vehicle is traveling on a road satisfying a predetermined condition on a basis of the image information acquired by the imaging device, perform an imaging height detection process of detecting, upon detecting that the vehicle is traveling on the road satisfying the predetermined condition, a distance in a height direction from a surface of the road satisfying the predetermined condition to an installation position of the imaging device, and comprehensively control the whole vehicle traveling control apparatus, wherein the circuitry is configured to perform a separation height estimation process of estimating, on a basis of a detection result obtained by the imaging height detection process and the preset height position information of the imaging device, a height of a separation part between a surface of a road with which a wheel of the vehicle is in contact and the surface of the road satisfying the predetermined condition, perform a sensor height estimation process of estimating, on a basis of an estimation result obtained by the separation height estimation process and the preset height position information of the sensor device, a distance from an upper surface in a gravity direction of the separation part to an installation position of the sensor device, and stop detection by the sensor device in a case where an estimated value obtained by the sensor height estimation process becomes a predetermined threshold or less.

\* \* \* \* \*